United States Patent

[11] 3,589,077

| [72] | Inventor | Ronald L. Lenning<br>Cincinnati, Ohio |
|---|---|---|
| [21] | Appl. No. | 734,787 |
| [22] | Filed | June 5, 1968 |
| [45] | Patented | June 29, 1971 |
| [73] | Assignee | Cincinnati Milacron Inc.<br>Cincinnati, Ohio |

[54] CONTROL FOR CUTTING TOOL
7 Claims, 5 Drawing Figs.

| [52] | U.S. Cl. | 51/165 |
|---|---|---|
| [51] | Int. Cl. | B24b 49/00 |
| [50] | Field of Search | 51/165,<br>165.01, 165.03, 165.04, 165.045, 165.18 |

[56] References Cited
UNITED STATES PATENTS

| 2,168,596 | 8/1939 | Hall | 51/111 |
|---|---|---|---|
| 2,802,312 | 8/1957 | Gosney et al. | 51/165 |
| 2,984,952 | 5/1961 | Gebel | 51/165 |
| 3,037,332 | 6/1962 | Wiatt et al. | 51/165 |
| 3,394,501 | 7/1968 | Carlson et al. | 51/165 X |

*Primary Examiner*—Lester M. Swingle
*Attorney*—Frank C. Leach, Jr.

ABSTRACT: A grinding wheel has its feedrate controlled in accordance with a force exerted on the grinding wheel when it is in cutting engagement with the workpiece. The force is compared with a reference force, and the difference is utilized to select the feedrate of the grinding wheel into the workpiece. When the workpiece is reduced by the grinding wheel to a predetermined size, the reference force is changed.

PATENTED JUN29 1971 3,589,077
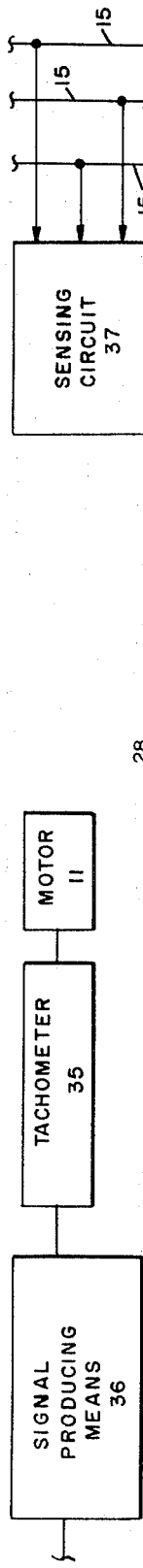
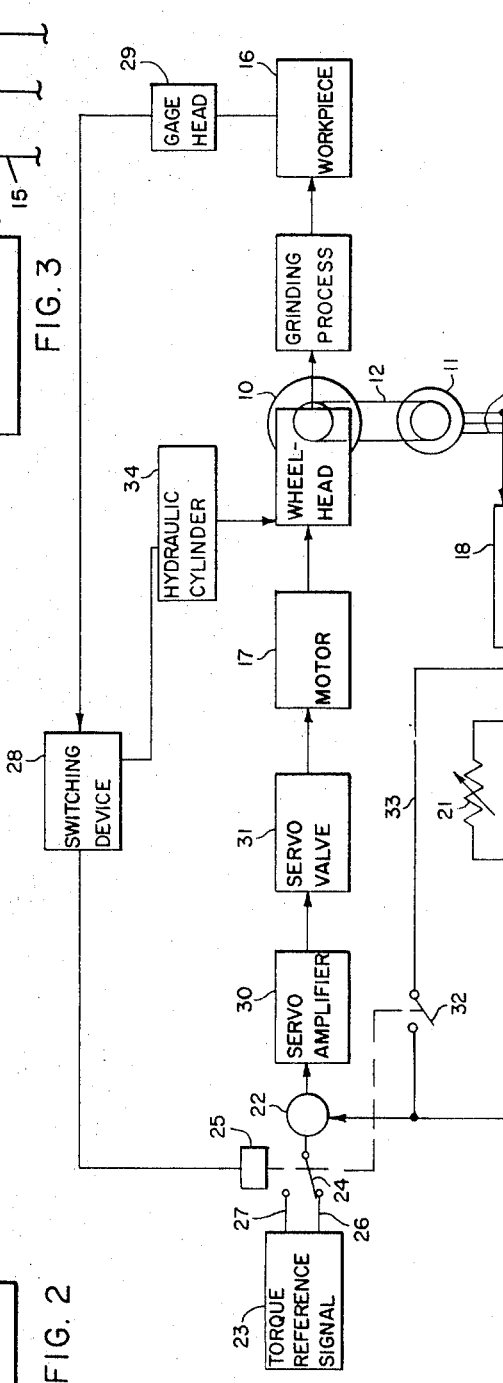
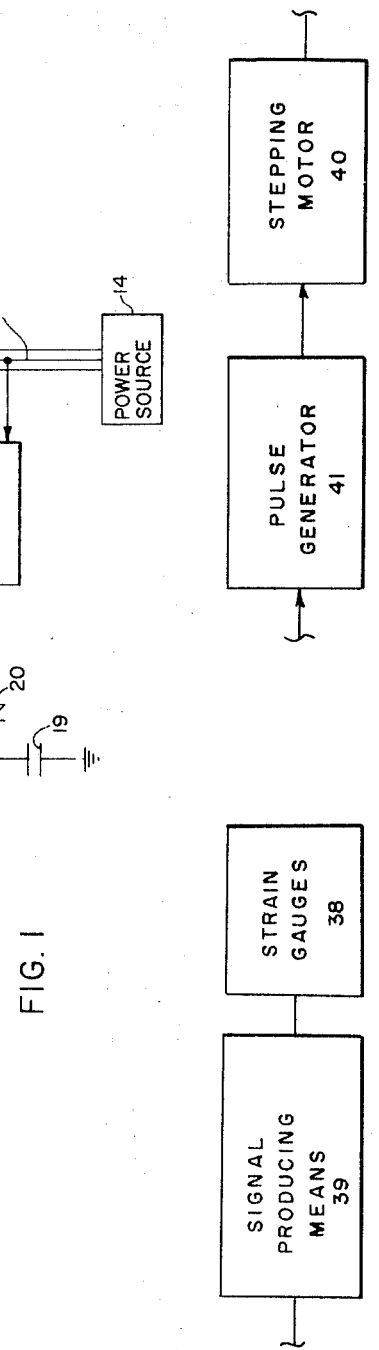
INVENTOR.
RONALD L. LENNING
BY Frank C. Leach Jr.
ATTORNEY

CONTROL FOR CUTTING TOOL

In automatic grinding machines, it is desirable to be able to completely grind a workpiece in as short a period of time as possible. This is because of the relatively high labor cost of the operator of the automatic grinding machine. Thus, if the period of time for grinding can be reduced and still produce a satisfactory product, this results in a reduction in the unit cost.

One previous way of controlling an automatic grinding machine has been to utilize a coarse feedrate of the grinding wheel into the workpiece until the workpiece has been ground to a predetermined size. At this time, a fine feedrate, which is substantially slower than the coarse feedrate, is employed to finish grind the workpiece. When the workpiece has been reduced to a second and smaller predetermined size, fine feed of the grinding wheel is stopped and the grinding wheel is retracted from the workpiece. Before retraction, sparkout occurs whereby the grinding wheel surface finishes the workpiece without being advanced relative thereto. Thus, during sparkout, there is final removal of the material of the workpiece without any feeding of the grinding wheel toward the workpiece.

With the previously suggested apparatus, the coarse and fine feedrates exist irrespective of the forces acting on the grinding wheel. As a result, the grinding wheel and/or the workpiece may be damaged due to unexpectedly high cutting forces.

The only way in which damage can be avoided in the prior suggested apparatus is for the operator to retract the grinding wheel if the cutting forces on the grinding wheel become too high. Only an experienced operator will recognize this. Even if the operator recognizes that the cutting forces have become too high, this retraction and then return of the grinding wheel into cutting engagement with the workpiece increases the time and, thus, the unit cost.

The present invention satisfactorily solves the foregoing problems by controlling the feedrate of the grinding wheel toward the workpiece in accordance with the torque on the grinding wheel due to its being in cutting engagement with the workpiece. Furthermore, the present invention continuously varies the feedrate in accordance with the torque on the grinding wheel. In the present invention, a torque reference signal is set at one level during initial grinding of the workpiece and at a second and lower level during final grinding of the workpiece.

With the present invention, the time required to grind a workpiece is substantially reduced in comparison with the time previously required to automatically grind a workpiece in which coarse and fine feedrates were utilized with the fine feedrate being employed when the workpiece had been ground to a predetermined size. Tests have indicated that the previously suggested means for automatic grinding in which the coarse and fine feedrates were utilized have required as much as 50 percent more time to grind the same workpiece as when utilizing the present invention. Accordingly, a substantial saving in time is produced when utilizing the control system of the present invention.

In the previously suggested automatic grinding apparatus in which coarse feed was utilized until a predetermined size of the workpiece was obtained, a workpiece having a relatively large out-of-roundness would exert substantial forces on the grinding wheel. During such a steady feed of the grinding wheel into the workpiece, this large out-of-roundness could result in damage to the grinding wheel since there was no means by which the rate of infeed could be reduced until this large out-of-roundness was removed.

The present invention satisfactorily overcomes the foregoing problem by controlling the rate of infeed of the grinding wheel into the workpiece in accordance with the peak torque on the grinding wheel. Accordingly, if a workpiece has a large out-of-roundness, the feed rate of the grinding wheel into the workpiece is controlled in accordance with the peak torque, which is produced by the maximum out-of-roundness of the grinding wheel, rather than any average torque. Thus, the present invention prevents overloading of the grinding wheel during its infeed.

An object of this invention is to control the feedrate of a cutting tool into a workpiece in accordance with a force exerted on the cutting tool due to the cutting tool being in cutting engagement with the workpiece.

Another object of this invention is to provide a control for a grinding machine in which the rate of infeed of the grinding wheel is regulated.

Other objects of this invention will be readily perceived from the following description, claims, and drawing.

This invention relates to a control for a machine having a cutting tool to remove material from a workpiece. The control includes means to measure a force on the cutting tool due to the cutting tool engaging the workpiece and reference signal means providing an output. The control also has means to compare an output of the measuring means to an output of the reference signal means with the comparing means providing an output indicative of the difference of the two outputs and which is larger. The feedrate of the cutting tool toward and away from the workpiece is regulated by suitable means in accordance with the output of the comparing means.

This invention also relates to a method for controlling the feedrate of a cutting tool toward and away from a workpiece that is having material removed therefrom by the cutting tool. The method includes comparing a force on the cutting tool due to the cutting tool engaging the workpiece with a reference force and feeding the cutting tool into and away from cutting engagement at a rate in accordance with the difference between the force on the cutting tool and the reference force and which is larger.

The attached drawing illustrates preferred embodiments of the invention, in which:

FIG. 1 is a schematic block diagram illustrating the control of the present invention:

FIGS. 2 to 4 are schematic block diagrams illustrating other embodiments for producing a signal indicative of the torque on the grinding wheel for use with the control of the present invention; and FIG. 5 is a schematic block diagram of another form of motor for moving the grinding wheel relative to the workpiece with the motor controlled by the control of the present invention.

Referring to the drawing, there is shown a grinding wheel 10 that is rotatably driven by a motor 11. The motor 11 is connected by suitable means such as a belt 12, for example, to the grinding wheel 10 to rotate the grinding wheel 10. The motor 11 is connected to a suitable source of power 14 by conductors or power lines 15.

The grinding wheel 10 is adapted to be moved into engagement with a workpiece 16 by a motor 17, which is a hydraulic motor. The motor 17 is connected to the bed on which the grinding wheel 10 is supported to advance the grinding wheel 10 into and away from the workpiece 16.

When the grinding wheel 10 is in cutting engagement with the workpiece 16, the torque on the grinding wheel 10 is directly related to the power supplied to the motor 11 from the power source 14. Thus, as the torque on the grinding wheel 10 increases, the power required by the motor 11 also increases.

The present invention includes a transducer 18, which is adapted to measure the power supplied to the motor 11. Accordingly, the output of the transducer 18 is directly related to the torque on the grinding wheel 10. One suitable example of the power or watt transducer 18 is a Hall effect device such as that manufactured by Esterline Instrument Co., Inc. and sold as model No. 6286.

The output of the transducer 18 is supplied through a peak hold circuit, which comprises a grounded capacitor 19, a diode 20, and a variable resistor 21, to a differential amplifier 22. The peak hold circuit permits the signal supplied to the differential amplifier 22 to be substantially the peak torque on the grinding wheel 10 rather than the average torque.

Thus, when the grinding wheel 10 is grinding the workpiece 16 with the workpiece 16 being substantially out-of-round, the signal from the transducer 18 to the differential amplifier 22 is maintained at substantially the peak torque created when the "high spot" of the workpiece 16 is engaging the grinding wheel 10.

In the absence of the peak hold circuit, the input to the differential amplifier 22 from the transducer 18 would be variable over a substantial range if the workpiece 16 were substantially out-of-round. This is because the torque on the grinding wheel 10 substantially reduces when the grinding wheel 10 is no longer in engagement with the "high spot" on the workpiece 16. As a result, the control system of the present invention would attempt to increase the feedrate of the grinding wheel 10 into the workpiece 16 in an attempt to keep the torque on the grinding wheel 10 substantially constant. Then, during the next time that the grinding wheel 10 engages the "high spot" on the workpiece 16, a much larger force would be transmitted from the transducer 18 to the differential amplifier 22. In addition to causing a very jerky feedrate, this also would result in a substantial force being exerted on the grinding wheel 10 so as to possibly damage or destroy it.

The differential amplifier 22 receives a second input from a torque reference signal means 23 through a switch 24. The position of the switch 24 is controlled by a relay 25. When the relay 25 is not energized, the switch 24 connects to a lead 26 from the torque reference signal means 23. When the relay 25 is picked, the switch 24 connects with a second lead 27 from the torque reference signal means 23.

The potential on the lead 26 is substantially larger than the potential on the second lead 27. As a result, when the switch 24 engages the lead 26, a greater potential is supplied to the differential amplifier 22 than when the switch 24 is in contact with the lead 27. Thus, two different reference signal levels are supplied to the differential amplifier 22 depending upon the position of the switch 24. The larger of the two reference signals will be referred to as the coarse torque reference signal while the smaller, which is supplied through the lead 27, will be referred to as the fine torque reference signal.

One suitable means for supplying the potential would be to have the torque reference signal means 23 include a voltage divider with the total voltage supplied through the lead 26 and the lead 27 being connected intermediate the two ends of the voltage divider to supply a potential proportional to the potential on the lead 26. Accordingly, by changing the potential supplied to the lead 27, the relation of the potential on the lead 26 to the potential on the lead 27 may be varied as desired. Furthermore, by varying the total potential to the voltage divider of the reference signal means 23, the maximum signal on the lead 26 may be selected as desired.

The relay 25 is picked when suitable contacts in a switching device 28 are closed. The switching device 28 has the contacts closed to pick the relay 25 when a gage head 29 ascertains that the workpiece 16 has been reduced to a predetermined size by the grinding wheel 10. One suitable example of a device that sizes a workpiece, which is being ground, and causes closing of contacts is the machine tool sizing device shown and described in U.S. Pat. No. 3,037,332 to Wiatt et al. Any other suitable device for measuring the size of the workpiece 16 and providing an electrical signal when the size of the workpiece 16 reaches a predetermined size may be utilized.

The output of the differential amplifier 22, which receives the output of the transducer 18 and the torque reference signal means 23 as inputs and compares them, is supplied to a servo amplifier 30 where the signal is amplified to position a servo valve 31. The servo valve 31 controls the rate of fluid flow to the hydraulic motor 17.

As long as the signal from the torque reference signal means 23 exceeds the signal supplied from the transducer 18 through the peak hold circuit, the output of the differential amplifier 22 is positive and causes the grinding wheel 10 to be fed into the workpiece 16. As the difference between the reference signal from the switch 24 and the signal indicating the torque on the grinding wheel 10 decreases, the output of the differential amplifier 22 decreases to reduce the feedrate of the grinding wheel 10 into the workpiece 16. If the signal from the transducer 18 should become larger than the potential from the torque reference signal means 23, then the hydraulic motor 17 reverses and retracts the grinding wheel 10 away from the workpiece 16.

When the gage head 29 indicates that the workpiece 16 has been ground to a predetermined size by the grinding wheel 10, the relay 25 is picked due to the closing of a first set of contacts in the switching device 28. As a result, the switch 24 is moved to engage the lead 27. This causes a much smaller potential to be supplied as the signal from the torque reference signal means 23 to the differential amplifier 22.

The rate of feed of the grinding wheel 10 with the switch 24 engaging the lead 27 is dependent upon the difference between the potential on the lead 27 and the potential from the transducer 18. However, the peak hold circuit for the output for the transducer 18 is bypassed when the grinding wheel 10 is to be fed in the fine torque mode. Thus, when the relay 25 is picked, it not only moves the switch 24 into engagement with the lead 27 but also closes a switch 32 in a lead 33 whereby the signal from the transducer 18 bypasses the peak hold circuit. This insures that the peak hold circuit is not effective during fine torque feeding.

As the signal from the transducer 18 approaches the potential supplied to the differential amplifier 22 through the switch 24, the infeed rate of the grinding wheel 10 is reduced. If the output from the transducer 18 should exceed the output on the lead 27 from the torque reference signal means 23, the hydraulic motor 17 is reversed and retracts the grinding wheel 10 away from the workpiece 16. This automatically results in the signal from the transducer 18 dropping due to the grinding wheel 10 not engaging the workpiece 16 since there would be no torque on the grinding wheel 10. Thus, the hydraulic motor 17 would again return the grinding wheel 10 into engagement with the workpiece 16.

When the workpiece 16 is reduced to the desired size, a second set of contacts in the switching device 28 is closed. This results in energization of a hydraulic cylinder 34, which is connected to the bed having the grinding wheel 10 supported thereon, whereby the grinding wheel 10 is rapidly removed away from engagement with the workpiece 16.

Considering the operation of the present invention, the voltage or potential on the lead 26 of the torque reference signal means 23 is set to prevent the temperature of the grinding process from exceeding that at which the grinding wheel 10 or the workpiece can be damaged and/or the force exceeding that to which the grinding wheel 10 can be subjected to without damage. This selected potential is equal to the output of the transducer 18 indicating the maximum torque that the grinding wheel 10 can be subjected to without damage to the grinding wheel 10 or the workpiece 16 due to temperature or damage to the grinding wheel 10 due to the force acting thereon.

The potential on the lead 27 is determined by the desired surface finish and roundness of the workpiece 16. Again, the potential is equal to the output of the transducer 18 that indicates a torque on the grinding wheel 10 that will produce the desired surface finish and roundness.

The actuation of the second set of contacts in the switching device 28 is set to insure that the grinding wheel 10 will make several revolutions when it is in the fine torque mode. Thus, the predetermined size at which the switch 24 is moved from engagement with the lead 26 to the lead 27 is such that there will be several revolutions of the grinding wheel 10 before the workpiece 16 has the desired final size.

When the grinding cycle starts, there is no output from the transducer 18 because the grinding wheel 10 is not in engagement with the workpiece 16. Accordingly, rather rapid feeding of the grinding wheel 10 toward the workpiece exists until the grinding wheel 10 engages the workpiece 16. At this time, the torque on the grinding wheel 10 due to grinding of the workpiece 16 by the grinding wheel 10 produces an output from the transducer 18. The peak hold circuit insures that the signal from the transducer 18 to the differential amplifier 22 is substantially the peak torque on the grinding wheel 10. This insures that there is not rapid movement of the grinding wheel 10 into the workpiece 16 when the grinding wheel 10 is engaging a "low spot" on the workpiece 16 when the workpiece 16 is substantially out-of-round.

When the grinding wheel 10 has reduced the workpiece 16 to the predetermined size at which final finishing of the workpiece 16 is to occur, the gage head 29 senses that the workpiece 16 has reached this predetermined size. As a result, the first set of the contacts in the switching device 28 is closed to pick the relay 25. This not only moves the switch 24 from engagement with the lead 26 into engagement with the lead 27 but also closes the switch 32 in the lead 33. The capacitor 19 becomes essentially ineffective due to the low impedance of the transducer 18. Since the desired torque level is now relatively low due to the position of the switch 24 while the actual existing torque is still at the previously higher level due to the prior position of the switch 24, this causes a retraction of the grinding wheel 10 until the torque decreases to the new level.

After this slight amount of retraction of the grinding wheel 10 away from the workpiece 16, the hydraulic motor 17 feeds the grinding wheel 10 into the workpiece 16. This final feeding is at a lower rate than when the control system is operating in the coarse torque mode.

When the gage head 29 senses that the size of the workpiece 16 has been reduced to the final desired size, the second set of contacts in the switching device 28 is closed. As a result, the hydraulic cylinder 34 is actuated to rapidly retract the grinding wheel 10 away from the workpiece 16.

The present invention does not require any steady dwell period in which to finish the surface of the workpiece 16. The final finishing is obtained through the fine torque feed in the present invention.

While the present invention has utilized the power or watt transducer 18 to determine the torque on the grinding wheel 10, any other suitable means could be utilized to determine the cutting torque. It is only necessary that the means be capable of producing a signal indicative of the torque on the grinding wheel 10. For example, a tachometer 35 (see FIG. 2) could be employed to measure the slippage of the motor 11 and provide a signal indicative of this slippage to the differential amplifier 22. The tachometer 35 is connected to a signal producing means 36, which will produce an electrical signal for supply to the differential amplifier 22.

The current to the motor 11 also could be used since it is directly proportional to the torque on the grinding wheel 10. A sensing circuit 37 is connected to the lines 15, as shown in FIG. 3, to produce an electrical output, which is supplied to the differential amplifier 22.

Furthermore, the torque on the grinding wheel 10 could be measured by strain gauges 38 (see FIG. 4) mounted on the spindle of the grinding wheel 10. The strain gauges 38 are connected to a signal producing means 39, which generates an electrical signal in accordance with the output of the strain gauges 38 to indicate the torque on the grinding wheel 10 for transmittal to the differential amplifier 22.

While the motor 17 has been described as a hydraulic motor, it should be understood that an electrical stepping motor 40 (see FIG. 5), for example, could be employed if desired. In such an arrangement, the servo valve 31 would be replaced by a pulse generator 41.

While the present invention has been described with respect to controlling a grinding process, it should be understood that the control system could be utilized to control other types of cutting tools. It is only necessary to utilize some type of reference signal means indicative of different levels of cutting forces acting on the cutting too during cutting and to compare the cutting force with the reference signal.

An advantage of this invention is that it produces an equal or better quality product as to accuracy of the size, surface finish, and roundness in less grinding time than with previously available automatic grinding means. Another advantage of this invention is that it is easier to set up the grinding cycle.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What I claim is:

1. A control for a machine having a cutting tool to remove material from a workpiece, said control including:
    means to measure a force on the cutting tool due to the cutting tool engaging the workpiece;
    reference signal means providing an output;
    means to compare an output of said measuring means to an output of said reference signal means, said comparing means providing an output indicative of the difference of the two outputs and which is larger;
    said reference signal means has first and second outputs;
    means to connect only one of said first and second outputs of said reference signal means to said comparing means;
    means to feed one of the cutting tool and the workpiece relative to the other to move the movable one of the cutting tool and the workpiece toward and away from the other;
    and means to regulate said feed means to regulate the movement of the movable one of the cutting tool and the workpiece toward and away from the other in accordance with the output of said comparing means.

2. A control for a machine having a cutting tool to remove material from a rotatably driven workpiece, said control including:
    means to measure a force on the cutting tool due to the cutting tool engaging the workpiece;
    reference signal means providing an output;
    means to compare an output of said measuring means to an output of said reference signal means, said comparing means providing an output indicative of the difference of the two outputs and which is larger;
    means to maintain the output of said measuring means to said comparing means at substantially its maximum value during each revolution of the workpiece when the size of the workpiece exceeds a predetermined size;
    means to feed one of the cutting tool and the workpiece relative to the other to move the movable one of the cutting tool and the workpiece toward and away from the other;
    and means to regulate said feed means to regulate the movement of the movable one of the cutting tool and the workpiece toward and away from the other in accordance with the output of said comparing means.

3. A control for a machine having a cutting tool to remove material from a workpiece, said control including:
    means to measure a force on the cutting tool due to the cutting tool engaging the workpiece;
    reference signal means providing an output;
    means to compare an output of said measuring means to an output of said reference signal means, said comparing means providing an output indicative of the difference of the two outputs and which is larger;
    means to change the output of said reference signal means in accordance with the size of the workpiece;
    means to feed one of the cutting tool and the workpiece relative to the other to move the movable one of the cutting tool and the workpiece toward and away from the other;
    and means to regulate said feed means to regulate the movement of the movable one of the cutting tool and the workpiece toward and away from the other in accordance with the output of said comparing means.

4. The control according to claim 1 including means to change the position of said connecting means when the workpiece is reduced to a predetermined size.

5. The control according to claim 4 including:

means to maintain the output of said measuring means at substantially its maximum value;

and said changing means rendering said maintaining means ineffective when said changing means changes the position of said connecting means when the workpiece is reduced to the predetermined size.

6. The control according to claim 2 in which said cutting tool is a grinding wheel.

7. The control according to claim 6 in which:

means rotates said grinding wheel; and said measuring means measures the power supplied to said rotating means.

UNITED STATES PATENT OFFICE
CERTIFICATE OF CORRECTION

Patent No. 3,589,077　　　　　　　　Dated June 29, 1971

Inventor(s) Ronald L. Lenning

It is certified that error appears in the above-identified patent and that said Letters Patent are hereby corrected as shown below:

Column 2, line 37, the colon ":" should read a semi-colon -- ; --. Column 3, line 58, "too" should read -- tool --. Column 5, line 71, "too" should read -- tool --. Column 8, lines 3 to 6, "and said measuring means measures the power supplied to said rotating means" should be a separate paragraph.

Signed and sealed this 23rd day of May 1972.

(SEAL)
Attest:

EDWARD M.FLETCHER,JR.　　　　　　　ROBERT GOTTSCHALK
Attesting Officer　　　　　　　　　Commissioner of Patents